Dec. 1, 1936.   C. S. BROWN   2,062,394
CYLINDER BLOCK FOR AIR COOLED INTERNAL COMBUSTION ENGINES
Original Filed Nov. 27, 1934
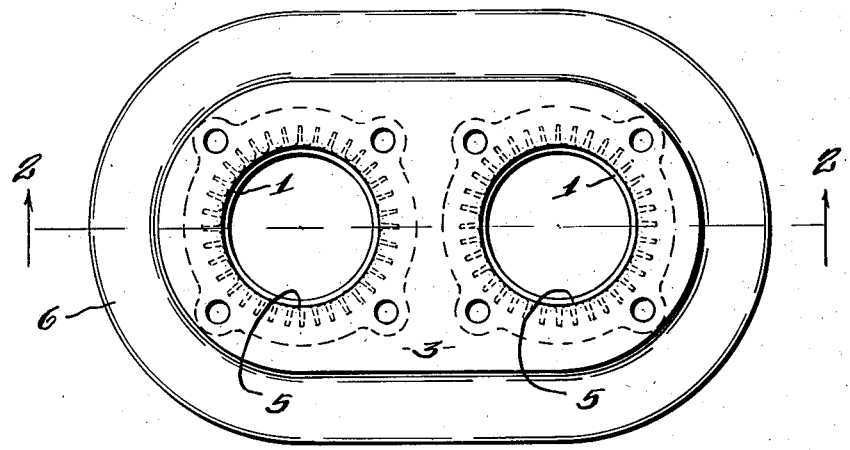
Fig-1-
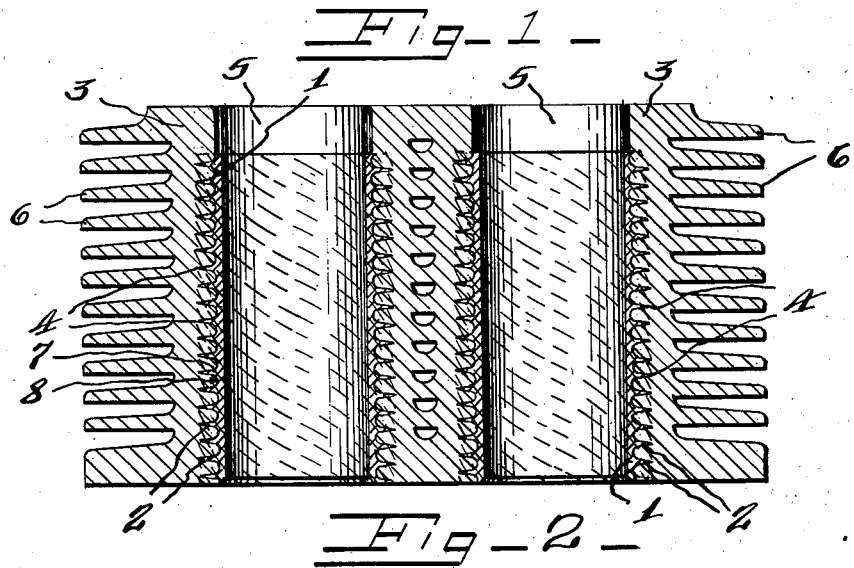
Fig-2-
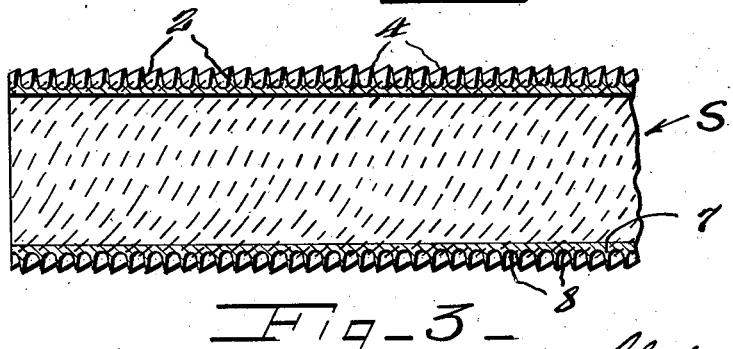
Fig-3-
INVENTOR.
Charles S. Brown
BY
ATTORNEYS.

Patented Dec. 1, 1936

2,062,394

UNITED STATES PATENT OFFICE 2,062,394

CYLINDER BLOCK FOR AIR COOLED INTERNAL COMBUSTION ENGINES

Charles S. Brown, Syracuse, N. Y.

Application November 27, 1934, Serial No. 755,030
Renewed May 15, 1936

1 Claim.  (Cl. 257—261)

This invention relates to air cooled internal combustion engines, and particularly to cylinder blocks consisting of a liner or liners, as of steel or other ferrous metal, and a considerably greater body or mass of metal cast around the liner and having greater heat conductivity or a greater coefficient of expansion, as aluminum or aluminum alloy, than the liner, and has for its object an arrangement of flanges on the liner, by which arrangement, the stresses are in both radial and lengthwise directions during cooling of the mass, after casting, and during expansion and contraction in the use of the engine, and are so distributed as to avoid warping, distortion and misalinement of the liner and straining of the flanges at least to an extent as to prevent breaking of the mechanical and thermal joints between them and the mass.

The invention consists in the novel features and in the combinations and constructions hereinafter set forth and claimed.

In describing this invention, reference is had to the accompanying drawing, in which like characters designate corresponding parts in all the views.

Figure 1 is a plan view of a cylinder block embodying this invention.

Figure 2 is a sectional view taken on line 2—2, Figure 1.

Figure 3 is a fragmentary longitudinal sectional view of the flange tubing from which the liners are formed.

I have here illustrated my invention as embodied in a multi-cylinder engine block consisting of two cylinders. However, it may be embodied in a single cylinder or a multi-cylinder block with a greater number of cylinders. The cylinder comprises a sleeve or liner of steel or other suitable metal having external flanges extending spirally around the same and extending from end to end of the liner, and a block of metal having greater heat conductivity or coefficient of expansion, as aluminum or aluminum alloy, cast around the liner and joined to the liner and the flanges thereof which are embedded in the body or mass, these flanges being of knife blade thinness terminating in a knife edge and being more or less flexible under differential expansion and contraction of the liner and the mass, although the mass is so proportioned to the liner as to, when heated, heat and keep heated the liner and the flanges thereof, so that there is a minimum of differential expansion and contraction during cooling of the engine and also heating up of the engine in use. During heating up, the liner heats first and is cooled by the rapid absorption of heat therefrom by the surrounding mass, and if the surrounding mass which is always cooler than the liner, gets heated to such an extent that it expands faster than the liner, the flanges are free to flex. The spiral arrangement of the flanges also tends to compensate for any unequal expansion and reduces the flexing tendency.

1 designates the liners of steel or ferrous metal, these being machined or formed by rolling to have external spiral flanges 2. 3 designates the outer mass or body of aluminum or aluminum alloy or other metal having greater heat conductivity than the liner. The liner and flanges are embedded in the mass and the flanges are of knife-blade thinness terminating in knife edges at 4. The knife blade feature per se forms no part of this invention, but forms the subject matter of my pending application, Serial No. 742,627, filed Sept. 4, 1934. The flanges 2 extend from end to end of the liners at an angle to the axis of the liner in order to relieve differential stresses between the mass 3 and liner 2 in both axial and radial directions, so as to avoid breaking the thermal and mechanical joints between the mass 3 and the liner and flanges. The liner is preferably cut off in proper lengths from a tubular piece of stock S (Figure 3). The spiral arrangement of the flanges lends itself to the economical manufacture of the liner from tubular stock.

The flanges 2 are arranged as close together as possible, so that their bases 7 widen and join the bases of the next flanges forming narrow grooves 8 with rounding bottoms between the flanges. The grooves 8 are narrow and the flanges spaced apart far enough to let the molten metal mass pass easily between them during the casting operation.

In forming the cylinder block, the liners are set in a mould and afterwards the mass of metal poured into the mould around the liner and allowed to cool. Owing to the relatively large mass, the heated mass keeps the liner heated during the cooling step, so that differential contraction of the liner and the mass is prevented during the cooling. During the casting operation, the metal is poured into and through the mould, until the liner is preheated to the proper degree or the proper redness, as determined by the foundryman and the pouring is discontinued and the casting allowed to cool.

The compression chamber 5 extends over the upper end of the liner. The head forming the top wall of the compression chamber is usually flat and the valves are located in the head. The mass 3 is also provided with external heat radiating flanges 6.

Owing to the arrangement of flanges of the liner in a spiral direction, undue strains are prevented both in axial and radial directions, and also both during the forming of the block and in the use of the block in the engine.

What I claim is:—

An air cooled internal combustion engine cylinder block comprising a liner having external spiral flanges extending from end to end thereof, and a body of a metal having greater heat conductivity and coefficient of expansion than the metal of the liner in which body the liner and its flanges are embedded and to which the liner and its flanges are united by a thermal and mechanical joint, said flanges being of knife-blade thinness and more or less flexible.

CHARLES S. BROWN.